United States Patent
Seeler et al.

(10) Patent No.: US 7,130,547 B2
(45) Date of Patent: Oct. 31, 2006

(54) SYSTEM AND METHOD FOR REMOTE MAINTENANCE, REMOTE CONFIGURATION AND/OR REMOTE OPERATION OF AN ELECTRO-PHOTOGRAPHIC PRINTING SYSTEM OR COPYING SYSTEM

(75) Inventors: Matthias Seeler, Munich (DE); Berthold Kathan, Munich (DE)

(73) Assignee: Oce Printing Systems GmbH (DE)

( * ) Notice: Subject to any disclaimer, the term of this patent is extended or adjusted under 35 U.S.C. 154(b) by 109 days.

(21) Appl. No.: 10/780,801

(22) Filed: Feb. 18, 2004

(65) Prior Publication Data

US 2004/0190916 A1 Sep. 30, 2004

Related U.S. Application Data

(63) Continuation-in-part of application No. 10/692,034, filed on Oct. 23, 2003, now abandoned.

(30) Foreign Application Priority Data

Oct. 28, 2002 (DE) .................... 102 50 186

(51) Int. Cl.
  *G03G 15/00* (2006.01)
(52) U.S. Cl. ............................. 399/8; 399/11
(58) Field of Classification Search .............. 399/9, 399/11, 8
See application file for complete search history.

(56) References Cited

U.S. PATENT DOCUMENTS

| 5,229,942 | A | | 7/1993 | Nicholson et al. |
| 5,396,636 | A | | 3/1995 | Gallagher et al. |
| 5,512,979 | A | * | 4/1996 | Ogura ........................... 399/8 |
| 5,897,236 | A | * | 4/1999 | Hashimoto et al. ............ 399/8 |
| 6,009,284 | A | * | 12/1999 | Weinberger et al. ........... 399/8 |
| 6,141,507 | A | * | 10/2000 | Sawada ......................... 399/8 |
| 6,493,517 | B1 | * | 12/2002 | Hanson ....................... 399/11 |
| 6,915,085 | B1 | * | 7/2005 | Kawaura ....................... 399/8 |
| 2002/0080390 | A1 | * | 6/2002 | Ogura ....................... 358/1.15 |

FOREIGN PATENT DOCUMENTS

| GB | 2 352 892 | | 2/2001 |
| JP | 11-338739 | * | 12/1999 |

OTHER PUBLICATIONS

Magic Packet Technology AMD Quelle [2].
Wake Up To Wake-on-LAN Sep. 10, 2002 16:17.

* cited by examiner

*Primary Examiner*—Sandra L. Brase
(74) *Attorney, Agent, or Firm*—Schiff Hardin LLP

(57) ABSTRACT

In a system and method for remote maintenance, remote configuration and/or remote operation of an electrophotographic printing or copying system, a data processing system is connected with a communication unit of the printing or copying system via a network. Given a deactivated printing or copying system, the communication unit receives first data transmitted by the data processing system via the network and processes the transmitted first data. After receiving the first data, the communication unit activates a data processing unit of the printing or copying system. After the activation of the data processing unit, second data can be transmitted between the data processing system and the data processing unit.

34 Claims, 1 Drawing Sheet

SYSTEM AND METHOD FOR REMOTE MAINTENANCE, REMOTE CONFIGURATION AND/OR REMOTE OPERATION OF AN ELECTRO-PHOTOGRAPHIC PRINTING SYSTEM OR COPYING SYSTEM

RELATED APPLICATIONS

This Application is a continuation-in-part application of U.S. Ser. No. 10/692,034, filed Oct. 23, 2003 now abandoned entitled "System And Method For Remote Maintenance, Remote Configuration And/Or Remote Operation Of An Electrophotographic Printing System Or Copying System" in which the inventors are Matthias Seeler and Berthold Kathan.

BACKGROUND OF THE INVENTION

The invention concerns a system and a method for remote maintenance, remote configuration and/or remote operation of an electrophotographic printing system or copying system. A data processing system is connected via a network with a communication unit of the printing or copying system.

In known electrophotographic printers and copiers, with the aid of modems a remote data transmission connection is established to a service and maintenance computer that is located in a service station of the printer manufacturer. For this, the entire printer is activated and connected in a suitable operating state. A connection via a telephone network is produced between the modems. With the aid of this remote data transmission connection, data with error entries of an error list, what is known as the error history, are transmitted from the printer to the service and maintenance computer.

For error analysis, the printer or copier must be activated by an operating personnel of the printer manufacturer and connected in a predetermined operating state. Thus such an error analysis is only possible when operating personnel of the customer activates the printer or copier before the remote data transmission and deactivates it again after the data transmission. Thus the remote data transmission connection can only be established at times at which the operating personnel is present at the printer. If a customer operates a printer or copier, for example in Japan, and the service station is located, for example, in Germany, a time shift of seven or eight hours thus occurs. Service times for a remote data transmission must thereby be coordinated between customers and service technicians of the service station.

An arrangement to control and to transmit data between a mainframe and a copier controller is known from European patent EP 0 513 549 A2. A control unit for communication control is provided that is connected with the copier control. The communication control comprises a data processing system with a modem, whereby the communication with the mainframe occurs independently of the copier control. A data transmission occurs with the aid of an RS232 interface between the copier control and the communication control.

SUMMARY OF THE INVENTION

It is an object of the invention to specify a system and a method for remote maintenance, remote configuration and/or remote operation of an electrophotographic printing or copying system, via which a communication is also possible without further operation interventions by operating personnel at the printing or copying system.

According to the system and method for remote maintenance, remote configuration, and/or remote operation of an electrophotographic printing or copying system, a data processing system is connected with a communication unit of the printing or copying system via a network. Given a deactivation of the printing or copying system, first data are received by the data processing system via the network and the first data are processed by the communication unit. After the processing of the first data by the communication unit, a data processing unit of the printing or copying system is activated. Second data are transmitted between the data processing system and the data processing unit.

DESCRIPTION OF THE PREFERRED EMBODIMENT

Figure 1:
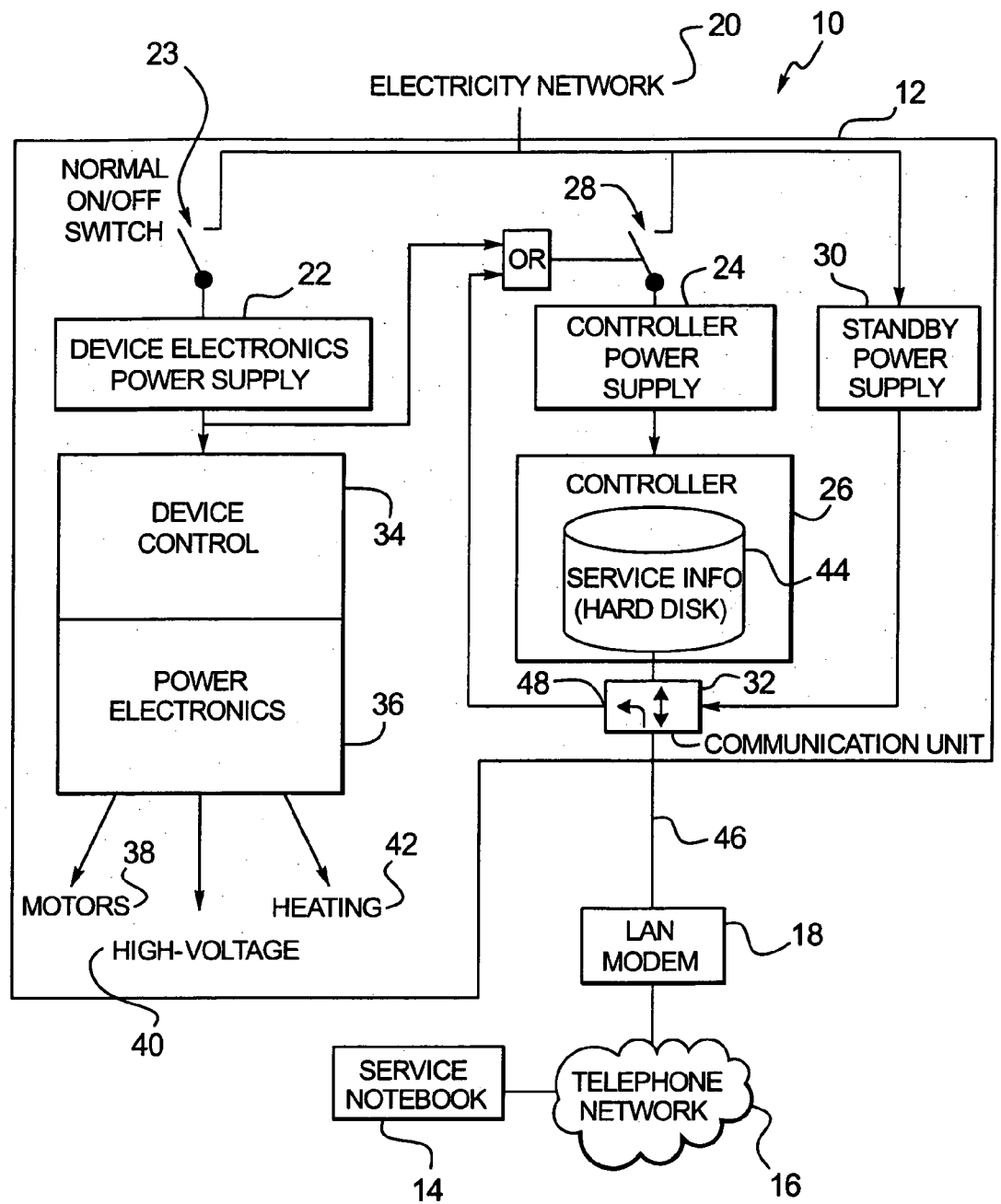
FIG. 1 is a block diagram with components to activate a connection for remote maintenance, remote configuration and/or remote operation of an electrophotographic printer.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

It is achieved via the system that data for remote maintenance, remote configuration and/or remote operation of the electrophotographic printing or copying system is also possible between the data processing system and the data processing unit without further operation interventions by operating personnel. The data transmission via the network is also possible given a deactivated printer, in that the communication unit activates the data processing unit. A remote maintenance, remote configuration and/or remote operation of the electrophotographic printing or copying system is thus also possible at times at which no operating personnel is present to activate and operate the printing or copying system. Furthermore, points in time or periods of time can be selected for remote maintenance, remote configuration and/or remote operation at which no print jobs are executed. Additional stop periods downtimes of the printing or copying system are thereby prevented.

A second aspect concerns a method for remote maintenance, remote configuration and/or remote operation of an electrophotographic printing or copying system. A data processing system is connected via a network with a communication unit of the printing or copying system. Given a disconnected printing or copying system, first data transmitted from the data transmission system via the network to the communication unit are transmitted to the communication unit and processed by it. After the processing of the first data by the communication unit, a data processing unit of the printing or copying system is activated. Second data are transmitted between the data processing system and the data processing unit.

It is achieved via this method that the remote maintenance, remote configuration and/or remote operation of the printing or copying system is also possible given a deactivated printing or copying system without further operation interventions at the printing or copying system by an operation personnel. The remote maintenance, remote configuration and/or remote operation can thus also occur at times at which the printing or copying system is not in operation. Additional stop periods for remote maintenance, remote configuration and/or remote operation of the printing or copying system are thus not necessary. The data processing unit of the printing or copying system is thus activated via the network connection. Further control units and structural units can, as the case may be, be activated together with or after the activation of the data processing unit.

To better understand the present method and system, reference is made in the following to the preferred exemplary embodiment shown in the drawing that is specified using specific terminology. However, it is to be noted that the scope of protection should not be limited thereby, since such changes and further modifications to the shown device and/or the method, as well as such further applications as they are shown therein, are viewed as typical present or future knowledge of a competent average person skilled in the art.

In FIG. 1 is a block diagram of a system 10 to activate a data transmission between a printer 12 and a service and maintenance computer 14 arranged apart. The service and maintenance computer 14 is, for example, a service notebook of a service technician. The service notebook 14 comprises a modem (not shown) via which a data connection can be established to a modem 18 of the printer 12 via a public telephone network 16. The service notebook 14 is located, for example, in a service center of the printer manufacturer. The printer 12 is connected with an electricity network 20, for example a public energy supply network, via which the energy required for operation is supplied to the printer 12.

The printer 12 comprises a device control power supply unit 22 that can be connected with the electricity network 20 with the aid of a switch 23 that is arranged on the printer 12. Furthermore, the printer 12 comprises a power supply unit 24 to provide operating voltages for a data processing unit 26 of the printer 12, whereby the power supply unit 24 can be connected with the electricity network via an electrically operable switch 28. Furthermore, the printer 12 comprises a power supply unit 30 that is continuously connected with the electricity network 20 and permanently supplies a communication unit 32 with an operating voltage.

The power supply unit 22 supplies a device control 34 and a power electronics assembly group 36 of the printer 12 with an operating voltage and supplies the necessary energy to these. With the aid of the power electronics assembly group 36, motors 38, a high-voltage unit 40 and heating elements 42 are activated. After the activation of the switch 23, the power supply unit 24 gives a signal for activation to the electronic switch 28, for example via output of the operating voltage. The switch 28 can, for example, be a relay or a contactor that is operated, i.e. activated with the aid of the operating voltage output by the power supply unit 22. The power supply unit 24 is thereby connected with the electricity network 20, whereby the power supply unit 24 supplies the data processing unit 26 with an operating voltage. The data processing unit 26 is also designated as a controller of the printer 12. The controller 26 comprises at least one non-erasable storage 44, for example a fixed disk storage. Error data and program data are stored in the fixed disk storage 44, as well as data with default values, counter readings and measurement values of the printer 12.

As was already mentioned, the standby power supply unit 30 permanently supplies the communication unit 32 of the controller 26 with an operating voltage. The communication unit 32 is preferably a network adapter for data transmission between the controller 26 and further data processing systems connected to a local area network (LAN). The network adapter 32 is connected with the LAN modem 18 of the printer 12 via a LAN connection 46. A point-to-point connection to the service notebook 14 is established via the LAN modem 18 over the telephone network 16. The network adapter 32 has a signal output 48 to which a signal is output to activate the electrical switch 28. A voltage is preferably output to activate the electrical switch 28. Alternatively, what is known as a driver circuit can be activated with the aid of the signal, via which the electrical switch 28 is then operated. The electrical switch 28 can thus be activated both via the power supply unit 22 and via the network adapter 32. The signals output by the power supply unit 22 and network adapter 32 to activate the electrical switch 28 are logically linked via an OR gate.

A network card is preferably used as a network adapter 32, as it is also used in personal computers for data communication between personal computers and further data processing systems connected to a network. In known network adapters 32 for personal computers, it is possible that the personal computer is activated by the network adapter upon receipt of predetermined data. Such an activation of the personal computer is also designated as Wake-on-LAN (WOL). It is known to activate, by an administrator or by an application of a further computer, a workplace personal computer that, for example, is connected with a local area network. If predetermined data with an activation command that, for example, comprises a network address (in particular an IP address) of the network adapter 32 are transmitted by the service notebook to the LAN modem 18 via the telephone network 16, these are supplied via the network connection 46 to the network adapter 36. The network adapter 32 processes the command, checks the network address, and implements the command upon agreement of the network address, in that it outputs to the signal output 48 a signal to activate the electrical switch 28.

With the aid of the electrical switch 28, as already specified, the power supply unit 24 is connected with the electricity network 20, whereby the controller 26 is supplied with operating voltage. After the controller 26 is supplied with operating voltage and is ready for operation, a service technician, with the aid of the service notebook 14, has access to the data stored on the fixed disk storage 44 of the controller 26. Between the service notebook 14 and the controller 26, data to diagnose the printer 12, data with counter readings of the printer, data with default values of the printer, data with measurement values, as well as data with data error documentation and error lists can thereby be transmitted between the service notebook 14 and the controller 26.

In addition to the fixed disk storage 44, a storage independent of operating voltage, what is known as NV-RAM, is provided in which further data can be stored that are transmitted from the service notebook 14 to the controller 26 or from the controller 26 to the notebook 14, as well as data that are transmitted from the controller 26 to the service notebook 14. The NV-RAM is a non-volatile random access memory and is used as non-volatile direct access storage (addressable memory). Given an error that has occurs, the error documentation comprises in particular relevant current default values, measurement values and operating states of the printer 12. Program data that should be subsequently executed in the controller 26 or the device control 34 upon operation of the printer 12 can also be transmitted from the service notebook 14 to the controller 26 and stored in the fixed disk storage 44.

A management information base of the printer 12 is also preferably comprised in the fixed disk storage 44. With the aid of the service notebook 14, a service technician can thus read out and check operating data such as counter readings and current default values of the printer 12. Files stored in the fixed-disk storage 44 can also be transmitted to the service notebook 14. Program data can also be transmitted from the service notebook 14 to the controller 26 and stored in the fixed-disk storage 44 that are to be implemented at a later point in time in the device control 34 or in the controller 26 by a service technician on site.

In other exemplary embodiments, a plurality of printers 12 are connected via the LAN 46 with the LAN modem 18, which is then preferably arranged outside of the printer 12. The LAN modem 18 then transmits the network addresses and, as the case may be, further data of the printer connected to the network 46 to the service notebook 14. With the aid of the network addresses, the service technician can select the printer 12 whose controller 26 should be activated. Alternatively, the possibility exists that data required for remote maintenance, remote configuration and/or remote operation are stored in the LAN modem 18, whereby the controller 27 does not have to be activated. If, for example, four printers are connected with the LAN modem 18 via the LAN 46, these four printers can thus be maintained. A connection to the LAN modem is in particular established with the aid of a telephone number of a telephone extension of the telephone network 16.

It is not necessary via the system 10 that an operating personnel must undertake operator control actions on the printer 12 or on the control panel of the printer 12 for remote maintenance, remote configuration and/or remote operation of the printer 12. After ending the remote maintenance, remote configuration and/or remote operation, a signal is no longer output by the network adapter 32 to the signal output 48, whereby the controller 26 is again deactivated.

In the activation, only components of the printer 12 are activated that are necessary for the remote maintenance, remote configuration and/or remote operation of the printer 12. Other assembly groups are not activated along with them, in particular for security reasons. It is further achieved via this system 10 that trips by the service technician to the customer can be saved, and thus costs for the maintenance and configuration of the printer 12 are reduced.

In particular given errors that are not easily remedied, with the aid of the system 10 specialists that can not come on site to the printer 12 in a justifiable time period and with justifiable expenditure can implement a remote maintenance, remote configuration and/or remote operation of the printer 12. Furthermore, versions of program elements can be transmitted to the printer 12 with the aid of the system 10. If a plurality of printers are connected with the LAN modem 18, in an advantageous embodiment, given activated printers, preset operating data is thus read out by the LAN modem from the printers and stored in a memory area of the LAN modem. Given a data connection between the service notebook 14 and the LAN modem 18, the stored data are then transmitted from the LAN modem 18 to the service notebook 14, whereby the printers 12 do not have to be activated, at least to access this data.

In a further exemplary embodiment, a connection via a wide area network (WAN), in particular via the Internet, is used for data transmission between the printer 12 and the service notebook 14. A secure connection is preferably established between the printer 12 and the service notebook 14. The activation of the controller 26 can optionally be prevented via a presetting of the printer 12.

Although a preferred exemplary embodiment is shown and specified in detail in the drawing and in the preceding specification, this should be viewed as being purely exemplary, and the invention should not be limited. It is to be noted that only the preferred exemplary embodiment is shown and specified, and all changes and modifications should be protected that presently and in the future lie in the scope of protection of the invention.

We claim as our invention:

1. A system for remote maintenance, remote configuration or remote operation of a printing or copying system, comprising:
   a network via which a data processing system is connected with a communication unit of the printing or copying system;
   the communication unit receiving and processing first data transmitted by the data processing system via the network when the printing or copying system is deactivated;
   dependent on the first data, after reception the communication unit activates a data processing unit of the printing or copying system;
   second data are transmitted between the data processing system and the data processing unit after the activation of the printing or copying system data processing unit; and
   the data processing unit activating only components of the printing or copying system that are necessary for the remote maintenance, remote configuration or remote operation.

2. The system according to claim 1 wherein with aid of the transmitted first data, an access occurs via the data processing system to a storage region of the printing or copying system, at least one default value of the printing or copying system being stored in the storage region.

3. The system according to claim 2 wherein a management information base of the printing or copying system is provided in the storage region.

4. The system according to claim 2 wherein the accesses are at least one of read and write accesses.

5. The system according to claim 2 wherein the accesses occur with the aid of a remote method invocation communication.

6. The system according to claim 5 wherein SNMP commands are transmitted with aid of the remote method invocation communication.

7. The system according to claim 1 wherein the activation of the data processing unit can be optionally deactivated.

8. The system according to claim 1 wherein at least one part of the network is a wide area network whereby a secure communication is produced via this network.

9. The system according to claim 1 wherein the communication unit and the data processing system are respectively connected with a modem whereby the modems are connected via a public telephone network.

10. The system according to claim 1 wherein the communication unit comprises a network adapter that, given a deactivated printing or copying system is supplied with an operating voltage.

11. The system according to claim 1 wherein the communication unit generates a signal when the first data comprises at least one of a network address of the communication unit and a MAC address of the communication unit.

12. The system according to claim 11 wherein with aid of the signal, a power supply unit is activated to supply energy to the data processing unit.

13. The system according to claim 1 wherein error data and default values of the data processing unit are transmitted to the data processing system, and data with program elements and default values are transmitted from the data processing system to the data processing unit.

14. The system according to claim 1 wherein the data processing unit is deactivated after the transmission of the second data.

15. A method for remote maintenance, remote configuration or remote operation of a printing or copying system, comprising the steps of:
  connecting a data processing system with a communication unit of the printing or copying system via a network;
  when the printing or copying system is deactivated, receiving first data sent by the data processing system via the network and processing that first data with the communication unit;
  after the processing of the first data by the communication unit, activating a data processing unit of the printing or copying system;
  transmitting second data between the data processing system and the data processing unit; and
  the data processing unit activating only components of the printing or copying system that are necessary for the remote maintenance, remote configuration or remote operation of the printing or copying system.

16. The method according to claim 15 wherein with aid of the transmitted first data, an access occurs via the data processing system to a storage region of the printing or copying system, at least one default value of the printing or copying system being stored in the storage region.

17. The method according to claim 16 wherein a management information base of the printing or copying system is provided in the storage region.

18. The method according to claim 16 wherein the accesses are at least one of read and write accesses.

19. The method according to claim 16 wherein the accesses occur with aid of a remote method invocation communication.

20. The method according to claim 19 wherein SNMP commands are transmitted with aid of the remote method invocation communication.

21. The method according to claim 15 wherein the activation of the data processing unit can be optionally deactivated.

22. The method according to claim 15 wherein at least one part of the network is a wide area network, whereby a secure communication is produced via this network.

23. The method according to claim 15 wherein the communication unit and the data processing system are respectively connected with a modem whereby the modems are connected via a public telephone network.

24. The method according to claim 15 wherein the communication unit comprises a network adapter that, given a deactivated printing or copying system, is supplied with an operating voltage.

25. The method according to claim 15 wherein the communication unit generates a signal when the first data comprises at least one of a network address of the communication unit and a MAC address of the communication unit.

26. The method according to claim 25 wherein with aid of the signal, a power supply unit is activated to supply energy to the data processing unit.

27. The method according to claim 15 wherein error data and default values of the data processing unit are transmitted to the data processing system, and data with program elements and default values are transmitted from the data processing system to the data processing unit.

28. The method according to claim 15 wherein the data processing unit is deactivated after the transmission of the second data.

29. A method for remote control of a printing or copying system, comprising the steps of:
  connecting a remote control data processing system with a communication unit of the printing or copying system via a telephone network;
  with the printing or copying system deactivated, sending first data by the remote control data processing system via the network to said communication unit, processing the first data with the communication unit, and dependent on that first data activating a data processing unit of the printing or copying system;
  transmitting second data between the remote control data processing system and the printing or copying system data processing unit; and
  the data processing unit activating only components of the printing or copying system that are necessary for the remote maintenance, remote configuration or remote operation.

30. A system for remote control of a printing or copying system, comprising:
  a telephone network via which a remote control data processing system is connected with a communication unit of the printing or copying system;
  with the printer or copying system deactivated, the communication unit receiving and processing first data transmitted by the remote control data processing system via the network;
  dependent on the first data, after reception thereof the communication unit activates a data processing unit of the printing or copying system;
  second data being transmitted between the remote control data processing system and the system data processing unit; and
  the data processing unit activating only components of the printing or copying system that are necessary for the remote maintenance, remote configuration or remote operation.

31. A system of claim 30 wherein the printing or copying system comprises an electrophotographic printing or copying system.

32. A system for remote control of a printing or copying system, comprising:
  a network via which a remote control data processing system is connected with a communication unit of the printing or copying system;
  said printing or copying system comprising a device control which controls device components and wherein said device control has its own device electronics power supply, said printing or copying system also having a controller which processes printing data of the printing or copying system, said controller having a controller power supply that is independent of said device electronics power supply; and
  said controller being activated remotely by said controller power supply via said communication unit connected with said network without operating said device control.

33. A system of claim 32 wherein said network comprises a telephone network.

34. A system for remote control of a printing or copying system, comprising:
- a network via which a remote control data processing system is connected with a communication unit of the printing or copying system;
- said communication unit having a wake-on-LAN function;
- said printing or copying system comprising a device control which controls device components and wherein said device control has its own device electronics power supply, said printing or copying system also having a controller which processes printing data of the printing or copying system, said controller having a controller power supply that is independent of said device electronics power supply; and
- said controller being activated remotely by said controller power supply via said communication unit connected to said network without operating said device control.

* * * * *